T. CARROLL.
CASH REGISTER.
APPLICATION FILED JUNE 6, 1903.
934,994.
Patented Sept. 28, 1909.
7 SHEETS—SHEET 1.
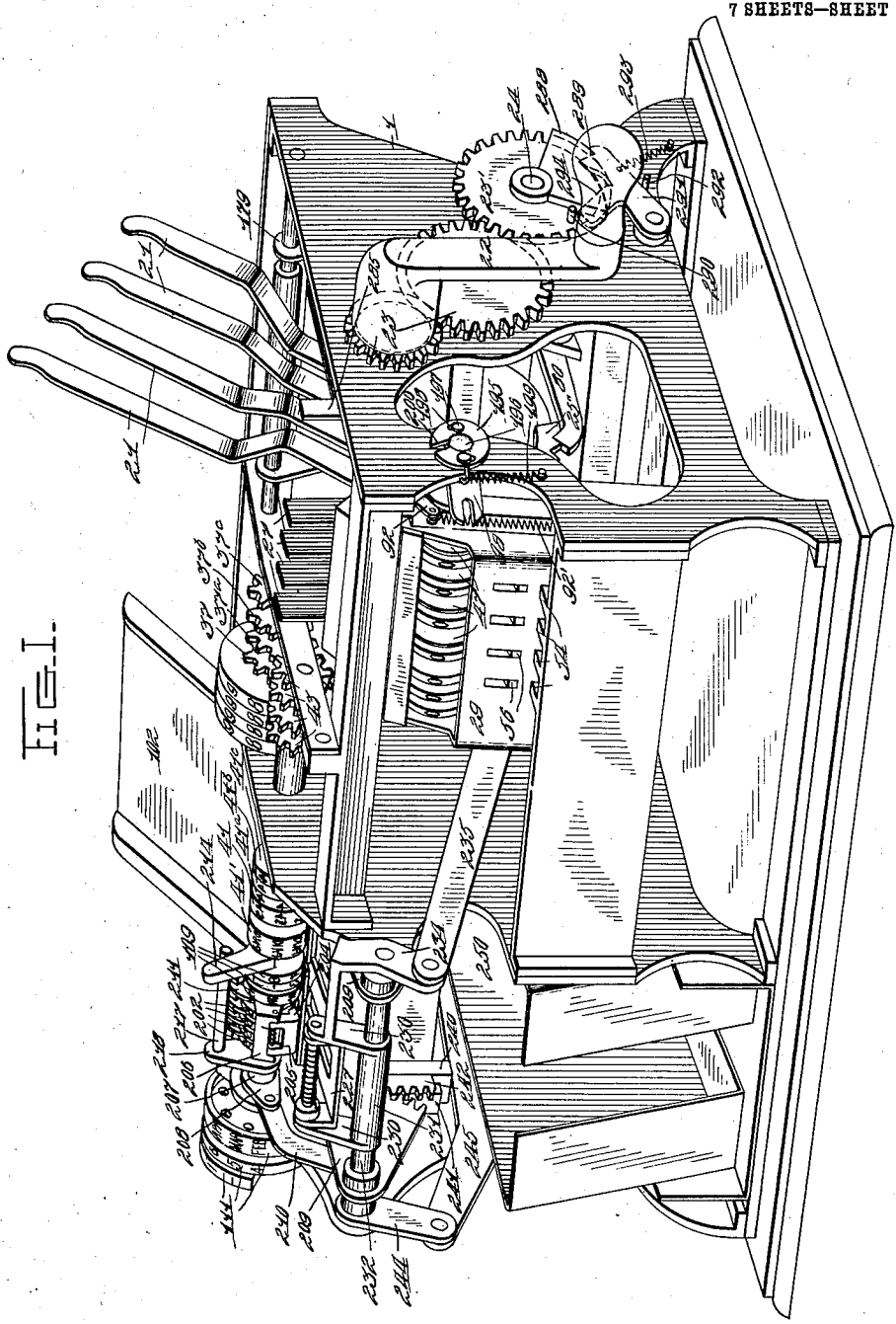

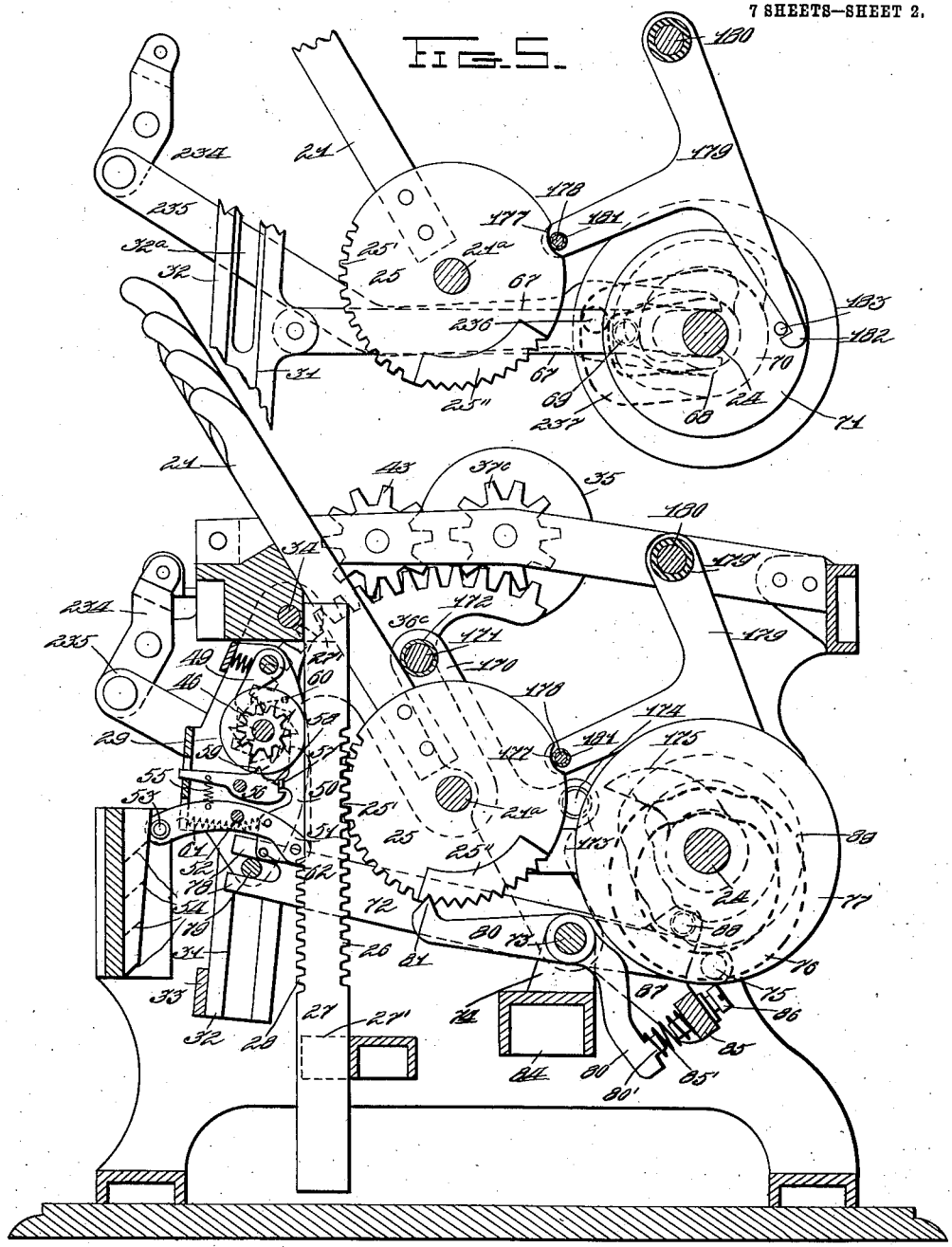

T. CARROLL.
CASH REGISTER.
APPLICATION FILED JUNE 6, 1903.
934,994.
Patented Sept. 28, 1909.
7 SHEETS—SHEET 3.
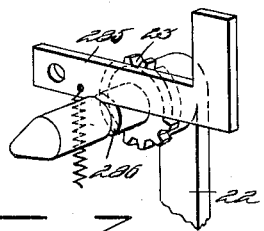
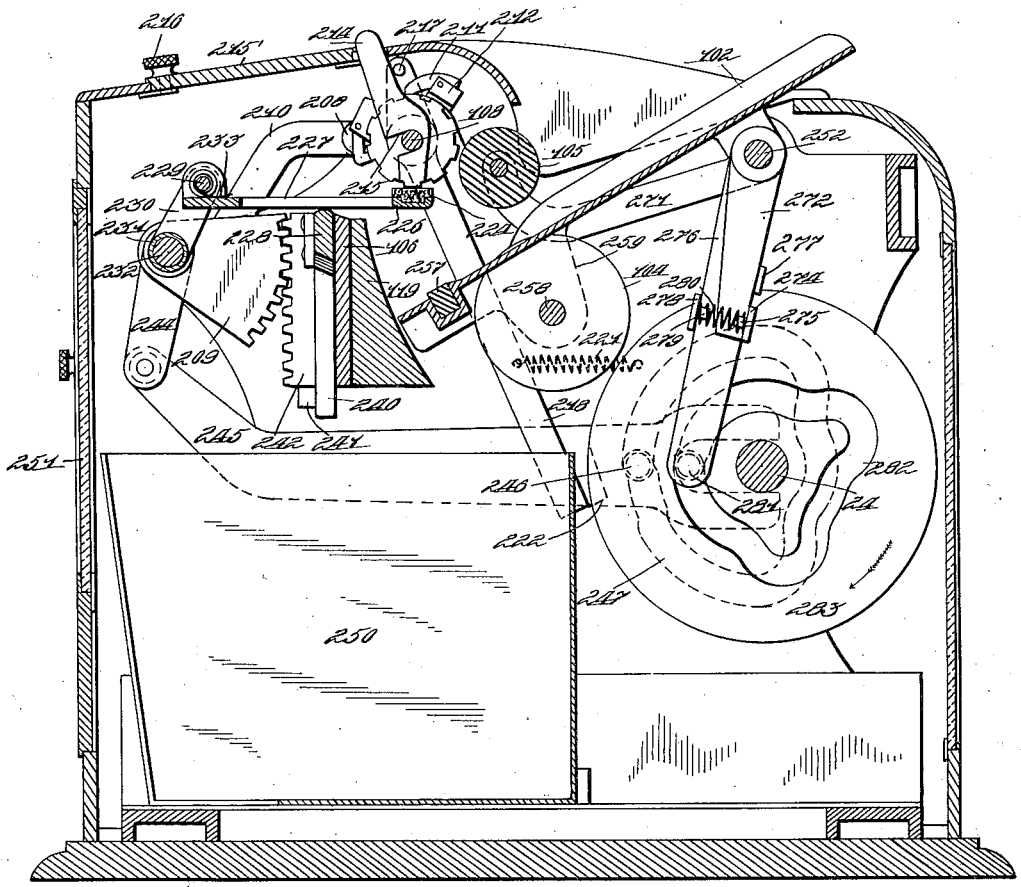
Witnesses
U. McCarthy
W. O. Henderson
Inventor
Thomas Carroll
by Parker Davis
Attorneys T. CARROLL.
CASH REGISTER.
APPLICATION FILED JUNE 6, 1903.
934,994.
Patented Sept. 28, 1909.
7 SHEETS—SHEET 4.
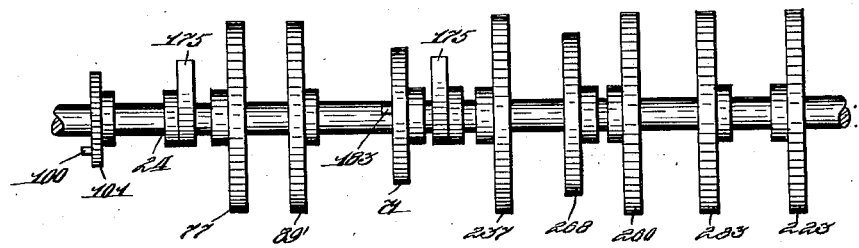
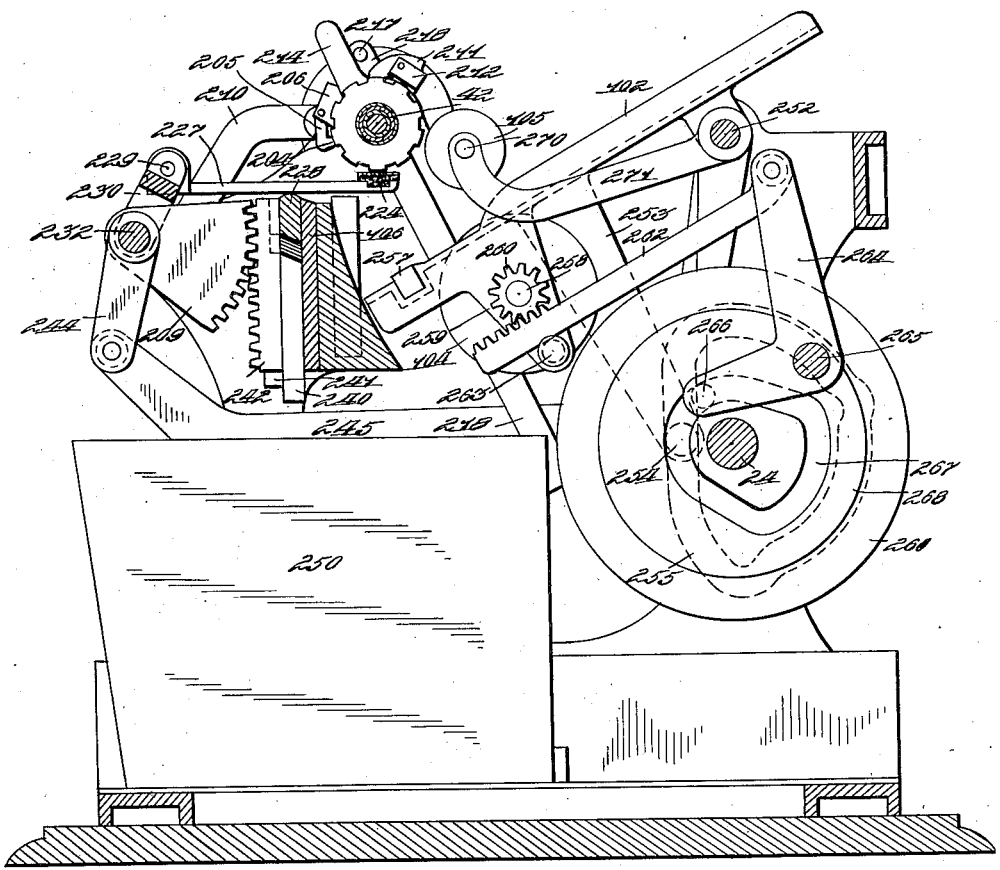

T. CARROLL.
CASH REGISTER.
APPLICATION FILED JUNE 6, 1903.
934,994.
Patented Sept. 28, 1909.
7 SHEETS—SHEET 5.
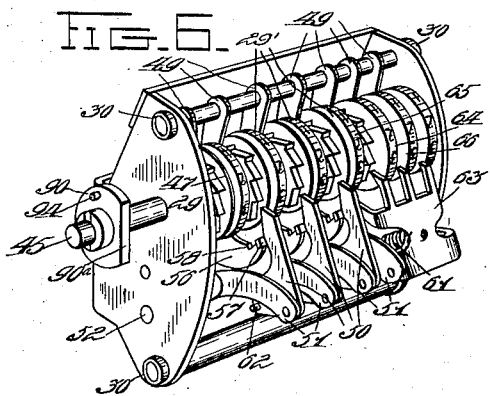
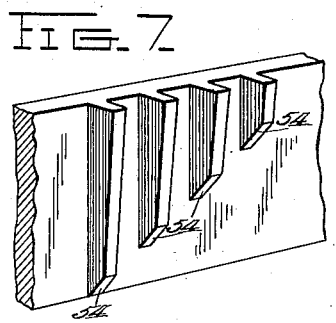
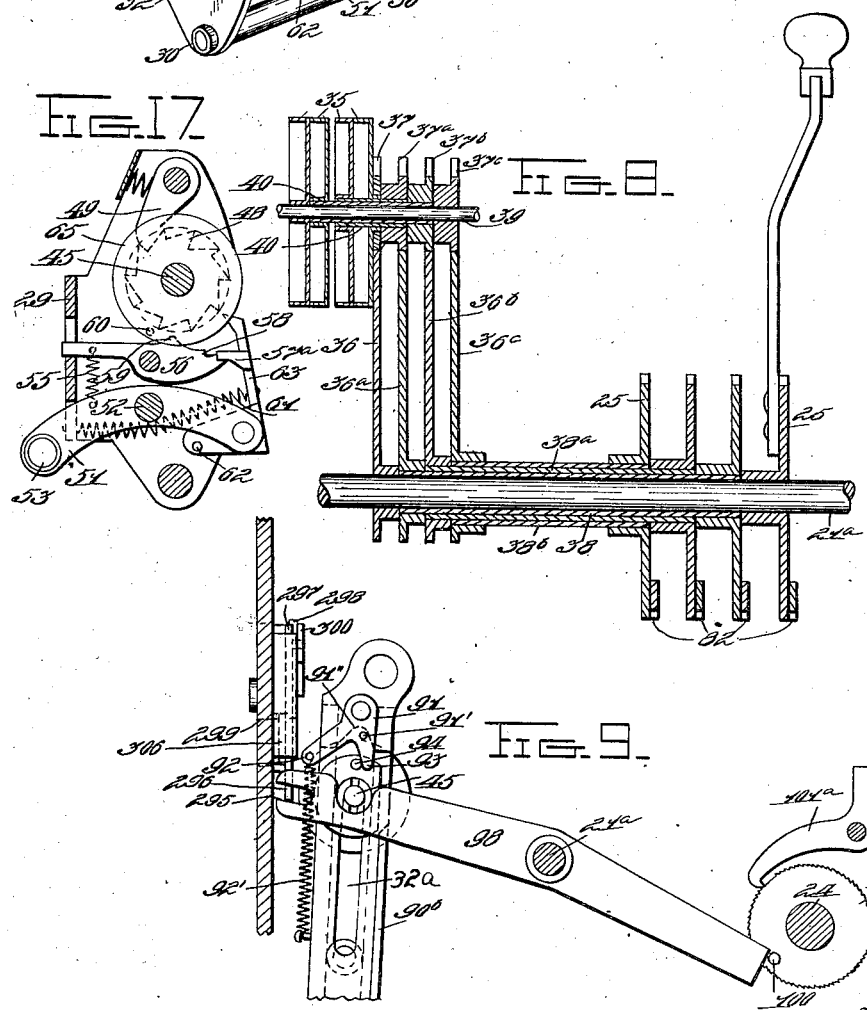
Witnesses
W. McCarthy
N. O. Henderson
Inventor
Thomas Carroll
Attorneys T. CARROLL.
CASH REGISTER.
APPLICATION FILED JUNE 6, 1903.
934,994.
Patented Sept. 28, 1909.
7 SHEETS—SHEET 6.
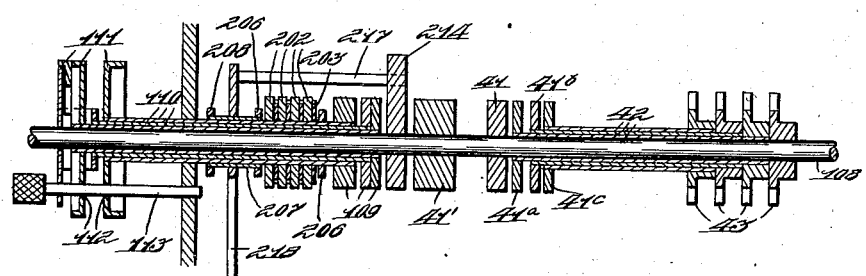
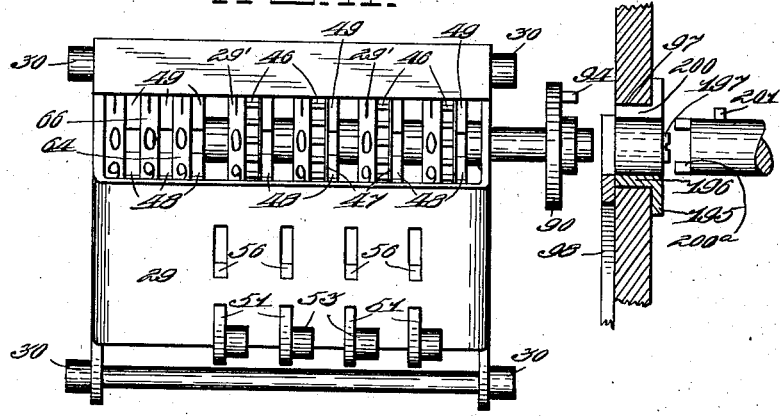
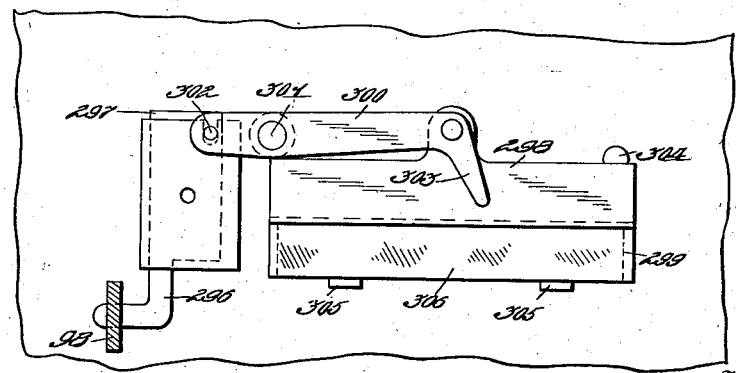
Witnesses
W. McCarthy
H. O. Henderson
Inventor
Thomas Carroll
Parker Davis
Attorneys

T. CARROLL.
CASH REGISTER.
APPLICATION FILED JUNE 6, 1903.

934,994.

Patented Sept. 28, 1909.
7 SHEETS—SHEET 7.

Fig. 14.

Fig. 13.

Witnesses
W. McCarthy
W. O. Henderson

Inventor
Thomas Carroll
Attorneys

UNITED STATES PATENT OFFICE.

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

934,994.  Specification of Letters Patent.  Patented Sept. 28, 1909.

Application filed June 6, 1903. Serial No. 160,416.

*To all whom it may concern:*

Be it known that I, THOMAS CARROLL, a citizen of the United States, residing at Dayton, in the county of Montgomery and State of Ohio, have invented certain new and useful Improvements in Cash - Registers, of which I declare the following to be a full, clear, and exact description.

This invention relates to improvements in registering and recording machines and has more particular relation to improvements in machines used in connection with checking systems employing checks, sales slips or receipts upon which the transactions are to be recorded by the machine.

One of the principal objects of the present invention is to provide improved printing devices in connection with machines of the character above mentioned, more especially as relates to the operation of the table carrying the sales slip, and to certain devices in connection with an identification key. Certain other novel constructions are also described and shown as forming part of the development of the entire machine but only those improvements relating to the printing devices are claimed herein.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1 represents a perspective view of the machine embodying my invention; the cabinet of the same being omitted to expose the mechanism more clearly to view. Fig. 2 represents a vertical transverse section through the machine just within the right-hand end of the same and through the counting mechanism. Fig. 3 represents a vertical transverse section through the machine and cabinet on the line of the printing platen and looking to the left. Fig. 4 represents a similar view taken to the right of the platen and movable table; the parts being in a different position and the cabinet omitted. Fig. 5 represents an enlarged detail side elevation partly broken away of the locking device for the operating mechanism, its coöperating parts, and the mechanism for actuating the counter shifting frame. Fig. 6 represents an enlarged detail perspective view of the counting mechanism. Fig. 7 represents a similar view of the cam flanges or projections for operating the transfer levers. Fig. 8 represents a detail vertical section taken through the setting sleeves, the special indicators and the connecting devices. Fig. 9 represents an enlarged detail side elevation of the full stroke wheel mounted on the rotation shaft and the coöperating locking devices for the machine and the counter. Fig. 10 represents a detail vertical transverse section through the type wheels, connecting sleeves and gearing. Fig. 11 represents a detail front elevation partly in section of the counter and its turn-to-zero devices. Fig. 12 represents a detail elevation of the counter flash and coöperating mechanism. Fig. 13 represents an enlarged detail top plan view of the slotted portion of the cabinet through which the setting levers pass. Fig. 14 represents a plan view of one form of check employed in connection with this machine; the voucher portion of the same being severed therefrom. Fig. 15 represents a detail rear elevation of the rotation shaft and the cams and disks carried thereby. Fig. 16 represents a detail perspective view of the locking device for securing the operating handle in position, and Fig. 17 represents a transverse vertical section through the counter.

The present invention covers improvements on the type of machine included in my present pending application No. 75,713 filed September 20, 1901.

Described in general terms the machine may be said to include a series of setting levers or elements, which when moved, position suitable racks over which the counter is subsequently drawn and thereby operated. It will thus be seen that in this particular form of register or recorder the amount to be accounted depends upon the positions of the setting levers at the time the operating handle is rotated to give the counting mechanism a vertical movement. If all of the setting levers are in a normal or zero position the machine cannot be operated, but when any one of said levers is adjusted to a position opposite a number on the scale plate shown in Fig. 13 the machine is unlocked and the rack connected to said setting lever is moved to a position in which a certain number of its teeth will project into the path of movement of one of the counter pinions and thus actuate the latter when the counter is moved over the rack. The power which is applied to the operating crank handle 22 is transmitted through suitable gears 23 and 23' to the rotation shaft 24 which extends across the rear of the machine and is journaled in the side plates of the frame 1. All of the various parts of the machine are driven from this rotation shaft 24 which will be hereinafter more particularly described.

The setting and registering mechanisms of the machine are more clearly illustrated in Fig. 2 and by reference to this figure it will be seen that each of the setting levers 21 is connected to a disk or plate 25 which is journaled upon a transverse shaft 21ª. Each of the disks 25 is formed with a series of rack teeth 25', and is provided with a toothed locking plate 25''. The gear teeth of the disks are at all times in mesh with rack teeth 26 upon the rear edges of four vertically sliding rack bars 27; these bars being also formed upon the front edges with registering rack teeth 28 with which the counting pinions coöperate. The bars 27 are mounted in suitable slotted guide bars 27' of the main frame whereby they are held to accurate vertical movements. It will be seen from the above that these registering rack bars will always occupy positions having a registering valuation corresponding to the positions of the setting levers 21. Thus, if one of the levers 21 is moved to a position representing five cents on the scale plate, the corresponding rack bar would be moved to a position in which five of its rack teeth 28 would be brought into the regular operating path of the particular pinion of the counter corresponding to the denominational value of the bar operated. The connections between the operating handle 22 and the movable counter are such, that the counter is first moved downward over the rack teeth 28 to actuate the counter wheels, then disengaged from said teeth and moved back to its normal upper position.

During the return movement of the counter the counter pinions are not in engagement with the rack teeth and during this time the transfer is effected. To this end the counter complete is supported in and carried by a frame 29 which has two anti-friction rollers 30 upon each end. The counter-frame, carrying the counter, is vertically slidable in a rock-frame which is formed of the two parallel, vertical side-arms 32 which are connected at their lower ends by a tie-bar 33. The inner side of each vertical side-arm has formed therein, a slideway or channel 31. The anti-friction rollers 30, of the counter frame, run in these slide ways, and in this manner the counter is guided vertically in its reciprocations. A cross-shaft 34 passes through bearings formed in the upper ends of the vertical side-arms 32, whereby the rock-frame carrying the counter, may be swung a limited distance toward the rear and back again to its normal position shown in Fig. 2.

The machine is arranged, when operated, first, to swing the counter a short distance toward the rear in order to bring the teeth of the counter-pinions in a vertical line with the registering rack-teeth. The counter is then moved downward so as to pass over the registering rack-teeth and be thereby operated. Third, the counter is swung toward the front of the machine out of engagement with the registering rack-teeth and finally the counter is moved upward to its normal position.

For convenience in setting or adjusting the levers 21 to the desired positions, they are given different lengths and are provided with small indicators 35 (shown in Figs. 1 and 2.) Each indicator is connected to its respective setting lever through its segment 25. The units-of-cents segment is secured rigidly upon the pivot-shaft 21ª. (See Fig. 8.) In like manner the units-of-cents driving segment 36 is secured upon said shaft and is always in mesh with the indicator pinion 37, secured to the units-of-cents indicator 35. The tens-of-cents segment 25 is secured upon the right-hand end of a sleeve 38, and upon the left-hand end thereof is secured the tens-of-cents driving segment 36ª. In like manner the units-of-dollars indicator segment 36ᵇ and the tens-of-dollars driving segment 36ᶜ are rigidly connected with their respective segments 25 through the sleeves 38ª and 38ᵇ. Through the sleeves 40 and the pinions 37ª, 37ᵇ, and 37ᶜ, which are all concentric and turn upon the indicator shaft 39, the indicators are geared to their respective driving segments. Under this construction it results that when a setting lever is moved, its respective indicator is correspondingly moved.

As shown in the drawings there are four amount or value printing-wheels, 41, 41ª, 41ᵇ and 41ᶜ, and these are connected in a well known manner through sleeves 42 and the pinions 43 with the respective driving segments 36, 36ª, 36ᵇ and 36ᶜ (Figs. 1, 2 and 10).

It results from the construction, just described, that the movement or adjustment of any setting lever directly and correspondingly moves the indicators 35, the registering rack bars 27, and the value printing-wheels. The indicators, therefore, form a convenient means for ascertaining if the various parts, just enumerated, have been properly adjusted so as to register and record the desired amount, because the operator can simply adjust the setting levers until the indicators show the amount he desires to register and can then be certain that the subsequent turning of the crank 22 will cause that desired amount to be registered and recorded.

As shown in Fig. 11, each of the first four counter or registering-wheels 29′, counting from the right, carries a registering pinion 46, which is arranged to engage with its respective racks 28. Each pinion is secured to the right-hand side of its respective registering wheel, and to the right-hand side of each pinion is secured a thin metal disk 47, of a diameter about equal to that of the registering wheel, and finally, to the right-hand side of each disk is secured the ratchet-wheel 48. The purpose of the disks 47 is to keep the registering-racks properly in engagement with the registering pinions.

Coöperating with the ratchet wheels 48 are the usual spring pressed retaining-pawls 49 to prevent retrograde movement of the registering-wheels. Transfer pawls 50 coöperate with the wheels 48 and are pivoted at their lower ends to the rear ends of the transfer levers 51, each of which is pivoted about midway of its length upon a cross-shaft 52 which is supported at its ends in the counter-frame. At its front end, each of the pawl-actuating levers carries an anti-friction roller 53. During the return movement of the counter; that is, while it is being swung upward to normal position, these anti-friction rollers contact with the fixed transfer-cams or projections 54, which are rigidly mounted near the front of the casing of the machine and are arranged in graduated order (see Fig. 7) so that the respective pawl-actuating levers will contact therewith successively and thereby be successively actuated. When so actuated the front ends are swung downward and their rear ends carrying the transfer pawls 50 are swung upward against the tension of the springs 55 which connect the pawl-carrying levers and the trip-pawls 56. The latter are, as usual, for the purpose of holding the transfer-pawls in their inoperative positions so that normally they will not engage the teeth of the ratchet-wheels 48, and hence normally will not move the registering-wheels, and this despite the fact that all of the pawl-carrying levers are successively actuated at each operation of the machine, and carry the pawls with them, (see Fig. 2.)

By reference to Fig. 7 it will be seen that the cam projections 54 are inclined so that when the counter-frame is in its normal position shown in Fig. 2 the levers 51 have been depressed sufficiently at their forward ends to cause the transfer-pawls to slightly overlap the teeth of the ratchet-wheels. This is to prevent the transfer-pawls falling in back of the ratchet teeth when the trip-pawls 56 are operated by the counter being turned to zero. The trip-pawl holds the transfer-pawl in inoperative position by reason of the normal engagement of an arm 57ª with the outer one of the two notches 58 formed on the rear end of the trip-pawl. The upper side of the said pawl is provided with an operating nose 59 which lies in the path of the trip-pin or projection 60, from which it results that when the registering wheel has made a complete revolution, the trip-pin will strike the operating nose 59 and thereby swing the rear end of the trip-pawl downward against the tension of the spring 55 and permit the transfer pawl to swing toward the ratchet under the impulse of a spring 61 until the arm 57 drops into the second or inner notch of the trip-pawl. Each spring 61 is connected at its forward end to the counter frame. The tripping action brings the upper operating end of the transfer pawl into such position that the transfer-pawl will turn the registering-wheel of next higher denomination one notch, when its respective lever 51 is operated. The stop-pin 62, one of which is carried by each transfer-pawl, is for the purpose of preventing said pawl from being inadvertently or otherwise thrown entirely out of engagement with the ratchet-teeth at the point of the extreme upward travel of said pawl which might permit over-throw.

The three registering-wheels on the left-hand end of the counter are not actuated directly by the registering-racks and receive movement only as it is transmitted to them from the tens-of-dollars registering-wheel. A single pawl actuating lever 51, shown in Fig. 6, has pivoted to its rear end a spring-pawl 63 which has three graduated teeth arranged in a manner well known in the art whereby the hundreds-of-dollars registering-wheel 64 is turned one notch whenever the tens-of-dollars wheel 65 has made a complete revolution. To this end I employ the usual trip-pawl 56 which coöperates with the tripping-pin 60 carried by the tens-of-dollars registering-wheel and with an arm 57ª on the pawl 63. The three-tined pawl 63 operates so that when the hundreds-of-dollars registering-wheel has made a complete revolution, the thousands-of-dollars registering-wheel 66 is turned one notch, and so on up through the capacity of the counter.

In Figs. 2 and 5 are shown the various devices for giving the counter two motions; that is, its horizontal movements and its vertical reciprocation. Its first horizontal movement, as previously stated, is for the purpose of bringing the registering-pinions 46 into the same vertical plane with the vertically-extending registering-racks. The vertical reciprocation of the counter is for the purpose of causing the registering pinions to pass downward into mesh or engagement with the then-stationary registering-rack teeth and over said teeth whereby the several registering wheels are turned to a greater or less extent according to the position of the setting-levers, and rack bars. When the counter has reached the lowermost point of its vertical travel, the counter is swung toward the front of the machine again, which disengages it from the registering-rack teeth, and then while held thus disengaged it is again moved upward to normal position.

The lateral movement of the counter is effected through a horizontal bar or link 67 (Fig. 5) which is pivoted to one of the side arms 32 of the rock-frame in which the counter frame slides. The rear end of the link is bifurcated, forming two fingers 68, which straddle the rotation shaft 24. Secured to one side of the link near its bifurcated end, is an anti-friction roller 69 which slides within a cam-groove 70 (shown in broken lines in Fig. 5) in the disk 71 fast upon the revolution-shaft 24. The configuration of the cam groove is such that as soon as the crank handle is started the counter frame is swung toward the rear to bring the counter pinions into alinement with the registering-rack-teeth, as heretofore described. It is held in this position while the counter frame is moved downward and is then thrown out and toward the front and thus held during the remainder of the operation of the machine.

The vertical reciprocation of the counter is brought about by the operating-lever 72, which is pivoted between its ends upon a horizontal shaft 73, which is supported by a suitable bracket 74 secured to the frame of the machine. At its rear end the operating lever carries an anti-friction roller 75 which runs within the cam-slot 76 (shown in broken lines in Fig. 2) formed in the disk 77, which is rigidly secured upon the rotation-shaft 24. At its front end, the operating lever is slotted, forming two arms 78 which straddle the shaft 79 of the counter-frame. By the means just described the counter is given a vertical reciprocation at each operation of the machine because the configuration of the cam-slot 76 is such as to swing the front end of the operating lever downward and back to normal position whenever the crank is turned and this of course causes the counter to slide downward in its ways 31 and then back to normal position.

It will be noticed that most of the parts of the machine which have a regular movement whenever the register is operated, are actuated by means of cam-grooves within disks which are fast upon the rotation-shaft 24. Such a disk, with its cam-groove, is sometimes technically known as a "box-cam" and it will be hereinafter so designated.

In order to aline the setting levers so that they will always stop at a point directly opposite some numeral upon the index plates, and for the further purpose of locking the setting levers and the parts controlled thereby, during the revolution of the crank handle, I provide a series of locking and alining pawls 80, best shown in Fig. 2, and pivotally mounted upon the transverse shaft 73. These pawls are of bell crank formation and the forward end of each is formed into a wedge shaped upturned nose 81 which coöperates with the teeth of its respective locking plate 25″. The downwardly turned rear ends of these pawls extend in front of the cross bar of a locking frame 85 which is pivotally mounted upon the shaft 73. The frame 85 is provided with a series of set screws 86 which coöperate with noses 80′ on the pawls 80 for adjusting the relative positions of the two parts. Coil springs 85′ are mounted upon the set screws 86 and the noses 80′ of the pawls to normally hold the two separated. The locking frame 85 is formed with an arm 87 which is provided with an anti-friction roller 88. This roller operates in the cam groove 89 of a box-cam 89′ which is secured upon the rotary shaft 24.

The formation of the cam groove 89 is such that when the parts are in their normal positions, shown in Fig. 2, the pawls 80 may be rocked downward by the operation of the respective disks 25 together with the levers 21. After the levers have been set however, and the rotation shaft moved from its normal position, the frame 85 is cammed downward and forward until the set screws or bolts 86 engage the noses 80′, when the pawls 80 become locked against movement thereby also locking the adjusting levers 21. After the registration has been made and the printing accomplished the pawls 80 are released and allowed to drop by the frame 85 rocking back to a position in which all tension upon the springs 85′ is removed. During the time the frame 85 remains in this position, the levers 21 are virtually free and are returned to their normal positions by devices hereinafter described. After the levers 21 have been so returned the frame 85 is again rocked forward into the position shown in Fig. 2, whereby the springs 85′ are put under tension to cause the pawls 80 to properly aline and restrain the levers 21 when they are subsequently operated. When any one of the levers 21 is actuated and while it is in a position intermediate any two characters on the index plates, the nose 80′ will be contacting with the end of its respective screw bolt 86, and if an attempt be made to operate the machine at this time, the initial downward movement of the frame 85 will force the alining pawls to become seated between the teeth on the plates 25″, and will thus move the levers 21 to positions in alinement with either one numeral or the other and lock them so. If any one of the levers 21 is held in an intermediate position by the operator, then the operating handle will be locked as no rotation of the shaft 24 can take place unless the frame 85 is free to move downward.

As before stated, the setting levers 21 that have been operated are returned to normal position during the latter part of each operation of the machine. This result is effected by means of pivoted levers 170 journaled upon the shaft 73 and connected by a tie bar 171 which is provided with a series of anti-friction rollers 172, which, when the frame is rocked, engage the respective levers 21 and force them forward. Each of the levers 170 is formed with a nose 173, carrying an anti-friction roller 174 which coöperates with a cam 175. These cams are mounted upon the rotation shaft 24 and are so formed as to force the levers 170 forward after the registration and the printing have taken place. When a lever is operated the bar 171 is only forced backward a distance equal to the movement of said lever.

Each of the disks 25 is formed with a notch 177 through which projects a tie bar 178 connecting two pivoted levers 179, which are fast to a sleeve 179' journaled upon a transverse shaft 180, as best shown in Figs. 2 and 5. The tie bar 178 is provided with a series of anti-friction rollers 181 which relieve the friction incidental to the contact of the walls of the notches 177 in forcing the tie bar rearward. One of the levers 179 is formed at its lower end with a hook 182 which normally stands in the path of a pin 183, mounted upon the box cam 71. By this means the operating crank handle is locked when all the levers 21 are in their normal positions. Should one of these levers, however, be moved from its normal position, the levers 179 will be cammed rearward and will thus move the hook 182 out of the path of the pin 183, to unlock the machine.

As will be seen in Figs. 6 and 9, the counter shaft 45 is extended at one end through the counter frame and through a slot 32ª formed in one of the side pieces. A stop disk 90 is secured to the outer end of this shaft. A stop pawl 91, pivoted on one of the side arms 32, coöperates with a pin 94, mounted upon the disk 90. The pawl 91 is limited in its movements by pin 91' projecting from the same into a recess 91", formed in the side bar 32.

The counter is, of course, turned to zero when in its upper position, and when in this position, the pin 94 will contact with the stop arm 93 of the pawl 91, if the counter shaft is rotated, and thereby arrest the counter wheels in zero position. This operation will move the pawl 91 out of its normal position against the tension of the spring 92', which connects an arm 92 of the pawl to the counter frame. When the counter is subsequently moved downward during any regular operation of the machine, the pin 94 disengages from the arm 93 and permits the pawl 91 to move back to its normal position. After the counter is so lowered and again raised, the pin 94 will occupy a position to the opposite side of the arm 93, and the counter shaft will thus be locked against retrograde movement.

The disk 90 is formed with a flat side 90ª which, when the counters move downward, passes along a vertical guide or flange 90ᵇ, formed on one edge of one of the side arms 32, as shown in Fig. 9. By this means the counter shaft is locked against any rotation except when it is in normal position in which the disk 90 is free of the flange 90ᵇ.

In order to prevent the crank handle from being started or operated while the machine is being turned to zero, I arrange the machine so that the turn-to-zero key or wrench must be inserted through an aperture formed in the side frame, in order to engage said key with the notched end of the counter shaft. Between this aperture and the end of the counter shaft, however, is located a pivoted lever 98 which is hung upon the shaft 21ª, and is operated as hereinafter described. The front end of this locking lever must, therefore, be swung down, away from the key aperture in the frame before the wrench can be fitted to the end of the counter shaft, and when this swinging takes place, the lever is brought directly in front of a locking pin 100 which is carried by a full stroke disk 101 mounted on the shaft 24, as shown in Fig. 9. A spring pressed pawl 101ª, coöperates with the disk 101 to prevent any retrograde movement of the same in a manner well known in the art. It results from this construction, as will be readily understood, that the machine cannot be operated while the counter is being turned to zero.

The aperture 97 is guarded by a movable disk 195, formed with a hub portion 196, which projects into the aperture 97 and forms a journal for the disk. The disk is limited in its movements by stop pins 197 which project through slots 198 formed in the disk. A coil spring 199 is connected to the disk and the main frame to normally draw the disk into the position shown in Fig. 1. A radial slot 200 is formed in the disk and hub for the passage of a pin 201 mounted on the turn-to-zero key (see Fig. 11). After the key has been partly inserted it must be turned backward slightly before its coupling projections 200ª can enter and become coupled to the end of the counter shaft. In so turning the key backward, the pin 201 will engage the rear wall of the slot 200 and rock the disk 195 slightly to the rear. When the key is now forced farther inward to couple it to the counter shaft, the disk

195 is released and allowed to return to its normal position by the pin 201 passing free of the slot 200. The turn-to-zero key must now be given a full revolution from its starting position and then turned a slight additional distance in order to bring the pin 201 into alinement with the slot 200, to permit the key to be withdrawn. By means of the above described device, it is necessary, in turning to zero, to always turn the key a slight distance in excess of a full revolution. The object of this construction is to assure a complete return of the counter wheels to their zero positions. It will of course be understood that the counter shaft is provided with the usual groove for the reception of the spring pressed pawls on the counter wheels whereby the shaft when rotated will pick up the counter wheels and carry them with it.

In practical use, before the machine is operated, a sales-slip or receipt, for example of the kind shown in Fig. 14, is filled out by the clerk making the sale. In the drawing the voucher is shown as severed from the main sales-slip, but normally it forms an integral part of it, though it is afterward severed by the machine, as will be presently described. Nor is the amount or date printed either upon the main sales-slip or upon the voucher until the slip is placed in the machine. Having filled out the entire sales-slip, usually with a pencil, the operator places it upon the inclined table 102 (shown in Figs. 1 and 3) and lets it slide down until its lower edge rests against the knife support 119 at the lower end of the table. He then adjusts the setting-levers according to the indicators, or if he prefers, according to the scales upon the front of the case of the machine, as shown in Fig. 13. When he has properly set the levers, the indicators should show exactly the amount he wishes to register on the counter and print upon the sales-slip. The operator now turns the crank 22. By means to be hereafter described, the lower end of the table is raised so as to bring the voucher portion of the sales-slip against the type-wheels, whereby there is printed upon the voucher portion the amount of the recorded transaction, the date, a consecutive number, the clerk's letter and any suitable word such as "Cash", "Paid" or the like. Then the feed-rollers 104 and 105 are actuated to feed the sales-slip into the machine so far that the voucher portion extends beyond the knife 106. The sales-slip is then again forced against the type-wheels, whereby the same data is printed upon the main body of the sales-slip, and simultaneously the knife 228 which has meanwhile been raised is actuated to sever the voucher portion. The movement of the feed-rollers is then reversed so that the main part of the sales-slip is fed back to a position from which it may be readily removed by the operator. The table then swings back to normal position.

As heretofore described, the amount or value-printing-wheels 41, 41$^a$, 41$^b$ and 41$^c$, are directly connected with the setting-levers 21, and they are all supported by the printer-shaft 108 above the lower end of the table 102.

In order to print upon the voucher and upon the main portion of the sales-slip the month and the day of the sale, I mount the date-printing wheels 109 on suitable sleeves 110 which turn on the printer-shaft 108 as shown in Fig. 10. The date-printing-wheels are therefore in alinement with the amount or value printing-wheels. For convenience in setting the date-printing-wheels, I have secured upon the outer end of each of the sleeves a turn-button 111. These thumb or turn-buttons 111 are formed with a series of apertures 112, through which a locking-pin 113 may be passed to secure the adjusting wheels in their adjusted positions and assure the proper alinement of the several type-wheels connected to said wheels. Besides the amount printing type wheels and the date printing wheels, a series of consecutive numbering wheels 202 are journaled upon the nested sleeve 110. These wheels are provided with ratchets 203 which are engaged by the operating fingers 204, of a spring pressed pawl block 205, when said block is rocked. By this construction the consecutive numbering wheels are advanced one number upon each operation of the machine. This block 205 is carried by a pivoted yoke 206 which is journaled upon the outermost sleeve 110 and is connected to an operating sleeve 207. This latter sleeve is provided with a crank arm 208 which is connected to an oscillating rack segment 209, by means of a pivoted link 210. As the segment 209 is oscillated upon each operation of the machine, as hereinafter described, the pawl block 205 is correspondingly moved upon each operation of the machine to advance the consecutive numbering wheels one unit. A series of spring-pressed pawls 211 mounted upon a transverse bar 212 of the main frame, engage the ratchet wheels 203 to prevent any retrograde movement of the consecutive numbering wheels.

The tens-of-dollars printing wheel is provided with a series of dollar signs opposite each numeral and in the space where the zero sign would ordinarily appear so that all amounts printed will appear with the dollar sign before them. The special printing wheel 41' is made fast to the shaft 108 and is provided with a series of similar type characters or words which will be printed beside each amount. In the present instance I have shown this special type wheel as formed with types for printing the word "Paid".

A special detachable clerk's printing type 214 is constructed with a notched portion 215, as best shown in Fig. 3, so that it may be applied to the shaft 108 at will, whereby different clerks or cashiers may set their own letter of designation for printing when they take charge of the station at which the machine is located. The application of this special clerks printing type is arranged to unlock the machine, and the withdrawal of said type to cause the machine to again become locked. For this construction it will be seen that it is impossible to operate the machine unless some clerk's or cashier's designation is in printing position. The key 214, when it is being placed in the machine, is first slipped over the shaft 108 and is then rocked rearward at its upper end to bring its lower type carrying end into printing position. The type is held in this position by a detachable cover 215', which is placed upon the cabinet against the special type-bar, and is secured in position by a turn button 216. When the bar 214 is forced rearward it engages a pin 217 of a crank arm or lever 218, journaled upon the sleeve 207. The lower end of the arm 218 is normally drawn rearward by a coil spring 221 connecting it to the main frame. The lower end of the arm 218 coöperates with a notch 222 formed in a disk 223 mounted upon the shaft 24. By reference to Fig. 4 it will be seen that before the key 214 is forced rearward the lower end of the lever 218 is projecting into the notch 222 and locking the rotation shaft against movement. After the special type 214 has been forced rearward, as shown in Fig. 3, the lower end of the lever 218 is moved out of the notch 222 and the machine thus unlocked. The printing line of types are inked by independent ink pads 224 and 225, of any suitable absorbent material, such as felt, for instance. These pads which are arranged for different colored ink are detachably mounted upon a cross-bar 226 on oscillating frame 227 which normally rests upon the movable knife-blade 228 as shown in Fig. 4.

The frame 227 is journaled on a rod 229, connecting the two arms 230 of a yoke 231 which is pivoted upon a transverse shaft 232 mounted in the main frame. A coil spring 233 connects the frame 227 and the rod 229 to normally force the frame down upon the movable knife 228. An angular arm 234 is journaled upon the end of the shaft 232 and is connected to one of the arms 230. The lower end of the arm 234 is pivotally connected to a link bar 235 that is slotted at its rear end to straddle the shaft 24 and is provided with an anti-friction roller 236 which projects into a cam-groove formed in a disk 237, which is mounted upon the rotation shaft 24. By means of the above construction the ink-pad carrying frame 227 is drawn back out of the path of the platen during the period of printing and is again moved forward into this inking position as the operation of the machine is completed.

The knife 228, as before stated, reciprocates against the stationary knife 106 and is guided in its reciprocations by guiding slides 240, which operate in suitable guide ways 241, formed in the main frame. Both of the guides 240 are provided with rack-bars 242. These bars mesh with the segmental racks 209; both of said racks being fast on the shaft 232. This shaft is rocked to oscillate the segmental racks by a crank arm 244 fast thereto and pivotally connected at its lower end to the link bar 245. This latter bar is slotted at its rear end to embrace the shaft 24 and is provided with an anti-friction roller 246 which projects into a cam-slot 247 of the disk 223, mounted on the shaft 24.

The formation of the groove 247 is such that the initial movement of the disk 223 will effect a slight upward movement of the knife 228 which will force the inking pads against the types that have been adjusted to printing position.

Later in the operation of the machine, the knife 228 is raised sufficiently to permit the check to be passed forward under said movable knife and over the stationary knife 106, whereby when the said knife 228 descends, the voucher will be cut from the check and fall into a suitable removable receptacle 250 mounted in the lower part of the casing and protected by a suitable lock-door 251.

As has before been stated, the platen or table 102 is given a double printing movement during each operation of the machine, first to print the voucher portion of the check, and then the check itself. For this purpose the table is journaled upon a shaft 252 and is provided with a rigid pendent arm 253, which is best shown in Fig. 4, and is provided at its lower end with an anti-friction roller 254. This roller projects into a cam-slot 255 formed in a disk 260, which is mounted upon the shaft 24. The platen proper 257 is mounted near the lower end of the table 102 so that when the latter is raised, this platen will force the check against the types at the printing line. A shaft 258 is journaled in lugs 259 pendent from the table 102 and carries a pinion 260 (see Fig. 4) and two horizontal feeding rollers 104; the latter projecting through suitable slots formed in the table 102. The pinion 260 meshes with a rack bar 262 which is held in position in relation therewith by a roller 263 journaled on one of the lugs 259. The bar 262 is pivotally connected to a bell-crank lever 264, which is pivoted upon the main frame as at 265, and is provided with an anti-friction roller 266 which projects into a cam-groove 267 formed in a cam 268 fast to the shaft 24. The formation of the cam-groove 267 is such as to feed a printed check forward to have the voucher portion cut therefrom and to bring it into position for the second printing operation and to then feed the printed main check back into a position in which it may be grasped by the fingers of the operator and removed from the table 102. The pressure roller 105, which is shown in Fig. 3, is normally disengaged from the rollers 104 and is mounted upon a transverse shaft 270 which in turn is mounted in the forward ends of arms 271 fast to the rock-shaft 252. The shaft 252 carries an arm 272 which is provided at its lower end with an ear 274, having a pin 275. A lever 276 is pivoted upon the shaft 252 and is provided with a stop ear 277 and an ear 278 carrying a pin 279 in a similar manner to the ear 274. A coil spring 280 is interposed between the ears 278 and 274 and is held in position by pins 275 and 279. The lower end of the lever 276 is provided with an anti-friction roller 281 which projects into a cam-groove 282 formed in the disk 283. The peculiar construction above described is to relieve the machine of the work of putting a spring device under excessive tension. After the rollers 104 engage the roller 105, the pressure between the two practically remains the same whether the table 102 is raised or lowered. The spring 280 is only slightly compressed during the time the rollers are in contact and this stress is made uniform during the various movements of the table by moving the spring support 276 correspondingly.

As it is desirable at times to remove the cabinet of the machine, through which the handle 22 passes, I have provided means whereby the handle may be easily removed for this purpose. This means comprises a pivoted spring drawn lever 285 (see Figs. 1 and 16) which is arranged to normally engage a locking notch or channel 286, formed near the inner end of the journal portion of the handle. This inner end of said journal portion of the handle is beveled so that when the handle is applied in a suitable journal aperture in the machine, it will raise the said pivoted latch, and by a continued inward movement, permit the same to enter the locking channel. By the above means the handle 22 may be instantly removed by simply raising the lever 285 and drawing the handle out sidewise.

In order to arrest the operating handle 22 in its normal position after it has made two complete revolutions, I provide the gear 23', which makes one revolution upon each operation of the machine, with a segment 288 having a locking notch 289. The gear 23' is also provided with a stop pin 290. A pivoted lever 291 is mounted upon the main frame and is normally drawn downward against a stop pin 292 by a coil spring 293. The lever 291 is provided with an arm 294 which, when the machine is operated, is engaged by the pin 290 to force the rear end of the pawl into the notch 289 to arrest the machine. The wall of the notch 289, as well as the nose of the pawl which enters the same, is constructed on a tangent to the shaft 24 and it is thus necessary after the parts have become locked to move the gear 23' back slightly in order to permit the pawl 291 to drop free of the locking notch.

It will be seen from the foregoing description that the machine is automatically arrested after two revolutions of the operating handle but may be instantly released again by a slight rearward pressure upon the handle.

As has been before stated, the lever 98 is normally locked in a position to prevent the turn-to-zero wrench being applied to the end of the counter shaft 45 to turn the counter to zero. For this purpose the forward end of the lever is formed with a notch 295 into which projects an angular arm 296 forming part of a bolt 297, as best shown in Figs. 9 and 12. The bolt 297 may be controlled by any suitable form of lock mechanism arranged to be operated by a detachable key. When the parts are in the position shown in Fig. 9, the bolt 297 has been thrown downward to permit the counter to be turned to zero. When the bolt is thrown in this manner it is also desirable to expose the counting wheels so that a reading may be made from the same before the counter is turned to zero. The counting wheels are normally concealed by a shutter or plate 298 which projects over a sight aperture 299 through which the counter wheels may be viewed. The shutter 298 is pivotally connected to one end of a lever 300 which is pivoted upon the main frame as at 301 and is connected to the bolt 297 by a pin 302. A spring arm 303 is formed on the lever 300 and engages the side of the shutter 298 to prevent any excessive vibration or rattling of the shutter during the time the same is being shifted. When the bolt 297 is moved downward the lever 300 is rocked on its fulcrum and the shutter 298 moved upward at its outer end. After this end has moved up a certain distance it contacts with a stationary pin 304 on the main frame and thus arrests this end of the shutter. As the lever 300 continues to operate the pin 304 becomes a fulcrum for the shutter with the result that the opposite end of the same is then raised until it contacts with the pivot pin 301. The shutter is moved downward in substantially the same manner, its lower edge contacting with stationary lugs 305 mounted on the main frame. These latter lugs also support a suitable transparent guard plate 306 which projects over the aperture 299.

While I have shown no cash drawer in connection with my present invention it will be readily understood that I can apply a cash receptacle and operate the latch of the same from the operating handle in any well known manner.

The machine illustrated in the present drawings is particularly applicable for use in connection with gas offices and the like where certain notices are sent out in the form of bills or checks and are usually paid by presentation at the office, together with the amount of the bill. Such checks or bills are inserted in the machine and the voucher cut therefrom and the bill at the same time stamped "Paid" so that it may be returned to the person making the payment as a receipt.

Certain of the subject matter shown and described herein is also described and forms the subject matter of claims in two divisional applications, Serial Numbers 253,001 and 254,648, filed by me on March 31, 1905 and April 10, 1905, respectively.

While the form of mechanism herein shown and described is admirably adapted to fulfill the objects primarily stated, it is to be understood that it is not intended to confine the invention to the one form of embodiment herein disclosed, for it is susceptible of embodiment in various forms, all coming within the scope of the claims which follow.

Having thus described my invention, what I claim as new and desire to secure by Letters Patent is:

1. In a cash register, the combination with an operating mechanism, of printing devices, a supporting table movable toward and away from said printing devices, a pressure roller carried by said table, a second pressure roller independent of the table, spring devices for this latter roller, and means intermediate the spring devices and the operating mechanism for maintaining a uniform tension of the springs during the varying movements of the table.

2. In a cash register, the combination with an operating mechanism, of printing devices, a movable table for supporting the slip to be printed, a pressure roller mounted independently of the table and arranged to contact with the slip thereon, spring devices for said roller, and means connecting the spring devices to the operating mechanism whereby constant tension is maintained during the varying movements of the table.

3. In a cash register, the combination with an operating mechanism, of printing devices, a movable pressure roller, a check support arranged to engage and move said roller, spring devices restraining the movement of the roller, and means intermediate the spring devices and the operating mechanism for maintaining a constant tension of said devices during the varying movements of the table or support.

4. In a cash register, the combination with an operating mechanism, of a printing mechanism including a movable check support, a pressure device movable with said support, spring means connected to said pressure device, and means connected to the operating mechanism for maintaining the spring device under the same tension during the different movements of the support.

5. In a cash register, the combination with an operating mechanism, and type carriers with setting means therefor, of a detachable special key formed with an identifying character thereon; a lock for said operating mechanism; and means for releasing said lock by said identification key when the latter is inserted into the machine and positioned to bring its identifying character into printing line.

6. In a cash register, the combination with an operating mechanism, and type carriers with setting means therefor, of a special key formed on one portion thereof with an identifying character; a bearing for said key; a lock for said operating mechanism; and lock operating means situated in proximity to said key bearing and operated by said key when the latter is positioned to bring its identifying type into proper printing line.

7. In a cash register, the combination with an operating mechanism, a series of type wheels with setting means therefor; a shaft for supporting said type wheels, and an inclosing casing, of a special key formed with a notch to engage said shaft to hold said key in printing position and also formed on one end thereof with an identifying character; a lock for said operating mechanism operated by said key when the latter is positioned to bring its identifying character into printing position; and a removable portion of said inclosing casing for holding said key in operative position.

8. In a cash register, the combination with an operating mechanism, of a printing mechanism, a movable check support, a pressure device, means connecting the check support to the operating mechanism, and spring means connecting the pressure device to the operating mechanism.

9. In a cash register, the combination with a printing mechanism, of a movable check support, feeding rollers carried by the same, an independently mounted feed roller, a spring device for holding the feeding rollers together, and means for preventing an increase in the tension of the spring device during the varying movements of the check support.

10. In a cash register, the combination with an operating mechanism, of printing devices, a movable check support, a movable pressure roller, a supporting lever for said roller, a pivoted lever connected to the operating mechanism, and a spring intermediate the two levers.

11. In a cash register, the combination with an operating mechanism, of a printing device, a feeding roller carrying a pinion, a rack bar engaging said pinion, a pivoted bell crank lever connected to and supporting one end of the rack bar, and a cam connected to the operating mechanism and engaging said bell crank lever.

12. In a cash register, the combination with an operating mechanism, of printing devices, a movable check support, a feeding roller carried by said support and provided with a pinion, a rack bar engaging said pinion, a pivoted bell crank lever connected to and supporting one end of the rack bar, and a cam for operating the bell crank lever connected to the operating mechanism.

13. In a cash register, the combination with an operating mechanism, of printing devices, a movable check support, feeding rollers mounted on said support, a pivoted frame carrying a feeding roller arranged to engage the first mentioned roller, means connecting the feeding roller on the check support to the operating mechanism, and spring means connecting the feeding roller in the movable frame to the operating mechanism.

14. In a cash register, the combination with an operating mechanism, of printing devices, an identification key arranged to be applied in the machine at will and having a pivotal section when so applied, and a pivoted locking device for the operating mechanism arranged to be actuated by the pivotal movement of the key.

15. In a cash register, the combination with an operating mechanism, of printing devices including a supporting shaft, an identification type key arranged to be applied to said shaft so as to have a pivotal movement thereon, and a lock for the operating mechanism actuated upon the pivotal movement of the key.

16. In a cash register, the combination with an operating mechanism, of printing devices, an inclosing cabinet having a removable cover, an identification key arranged to be held in position by the removable cover, and a lock for the machine controlled by the identification key.

17. In a cash register, the combination with an operating mechanism, of printing devices, a stationary knife, a movable knife carrying a rack, an oscillating rack segment engaging the rack, and means intermediate the operating mechanism and the oscillating segment for operating the latter.

In testimony whereof I affix my signature, in the presence of two witnesses.

THOMAS CARROLL.

Witnesses:
Wm. H. Muzzy,
J. B. Hayward.